United States Patent
Hao et al.

(10) Patent No.: US 10,095,911 B2
(45) Date of Patent: Oct. 9, 2018

(54) METHODS, DEVICES, AND COMPUTER-READABLE MEDIUMS FOR VERIFYING A FINGERPRINT

(71) Applicant: Beijing Xiaomi Mobile Software Co., Ltd., Haidian District, Beijing (CN)

(72) Inventors: Ning Hao, Beijing (CN); Wei Sun, Beijing (CN); Yizhen Yang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/378,707

(22) Filed: Dec. 14, 2016

(65) Prior Publication Data
US 2017/0249495 A1   Aug. 31, 2017

(30) Foreign Application Priority Data
Feb. 29, 2016   (CN) .......................... 2016 1 0112810

(51) Int. Cl.
*G06K 9/00*  (2006.01)
*G06K 9/32*  (2006.01)

(52) U.S. Cl.
CPC ..... *G06K 9/00026* (2013.01); *G06K 9/00087* (2013.01); *G06K 9/3208* (2013.01)

(58) Field of Classification Search
CPC ............... G06F 21/32; G06K 9/00026; G06K 9/00087; G06K 9/00006; G06K 9/3208; H04L 63/0861
USPC .................................................. 382/124, 282
See application file for complete search history.

(56) References Cited

U.S. PATENT DOCUMENTS

| 7,116,805 | B2 * | 10/2006 | Machida | ............ | G06K 9/00026 |
| | | | | | 382/124 |
| 8,638,994 | B2 * | 1/2014 | Kraemer | ............ | G06K 9/00013 |
| | | | | | 382/119 |
| 8,913,801 | B2 * | 12/2014 | Han | ................... | G06K 9/00013 |
| | | | | | 382/100 |
| 9,245,166 | B2 * | 1/2016 | Huang | ............... | G06K 9/00013 |
| 2001/0026636 | A1 | 10/2001 | Mainguet | | |

(Continued)

FOREIGN PATENT DOCUMENTS

CN    102737194 A    10/2012
CN    103310510 A    9/2013

(Continued)

OTHER PUBLICATIONS

Extended European Search Report in connection with EP Application No. 16204320.2, dated Jun. 7, 2017, 18 pages.

(Continued)

*Primary Examiner* — Daniel Mariam
(74) *Attorney, Agent, or Firm* — Arch & Lake LLP

(57) ABSTRACT

A method, a device, and computer-readable medium are provided for verifying an identity of a user, which pertains to computer technology. In some aspects, the method includes generating a dynamic fingerprint while the user moves a finger along a trajectory of movement in a fingerprint collection area of a fingerprint reader, and comparing the dynamic fingerprint with a referential fingerprint. The method also includes verifying the identity of the user based on the comparison, and generating a report indicating the identity verified.

18 Claims, 4 Drawing Sheets

(56) References Cited

U.S. PATENT DOCUMENTS

| | | | |
|---|---|---|---|
| 2009/0191846 A1* | 7/2009 | Shi | G06F 21/32 |
| | | | 455/411 |
| 2010/0220900 A1 | 9/2010 | Orsley | |
| 2014/0133711 A1* | 5/2014 | Abe | G06K 9/036 |
| | | | 382/115 |
| 2015/0324570 A1* | 11/2015 | Lee | G06K 9/3208 |
| | | | 382/124 |
| 2016/0217310 A1* | 7/2016 | Shah | G06K 9/001 |

FOREIGN PATENT DOCUMENTS

| | | |
|---|---|---|
| CN | 104281841 A | 1/2015 |
| CN | 105159585 A | 12/2015 |
| CN | 105354544 A | 2/2016 |
| EP | 0813164 A1 | 12/1997 |

OTHER PUBLICATIONS

Davide Maltoni: In: Davide Maltoni: "Handbook of Fingerprint Recognition, 2nd ed", Jan. 1, 2009 (Jan. 1, 2009), Springer, XP055386240, pp. 70-73.
Claudia Maienborn et al: "Semantics An International Handbook of Natural Language Meaning" In: "Semantics An International Handbook of Natural Language Meaning", Jan. 1, 2011 (Jan. 1, 2011), De Gruyter Mouton, XP055357650, p. 1485.
International Search Report for International Application No. PCT/CN2016/100078 dated Dec. 21, 2016, 12 pages.

* cited by examiner

METHODS, DEVICES, AND COMPUTER-READABLE MEDIUMS FOR VERIFYING A FINGERPRINT

CROSS-REFERENCE TO RELATED APPLICATION

This application is based on and claims priority to Chinese Patent Application No. 201610112810.5 filed on Feb. 29, 2016, which is incorporated herein by reference in its entirety.

FIELD

The present disclosure generally relates to biometric technologies, and more particularly to a method, a device, and computer-readable medium for verifying the identity of a user using fingerprints.

BACKGROUND

Currently, to verify the identity of a user, a system or device terminal first obtains various static prints by prompting the user to place hands or fingers on a sensor. The terminal then collects the static prints and stores them as references for later use. During verification, the terminal acquires user prints to be matched. By comparing the reference prints to the acquired ones, the identity of the user can be verified. As may be appreciated, such traditional technologies can come with certain risks. For example, if an intruder can obtain access to the reference prints, the security of the device or terminal, as well as other systems having information tied to user prints, can be compromised. Therefore, there is a need for improved biometric systems and methods.

SUMMARY

The present disclosure overcomes the drawbacks of previous biometric technologies. As will be described, the present disclosure introduces a novel approach for verifying the identity of a user based on dynamic fingerprint acquisition and analysis.

In one aspect of the present disclosure, a method for verifying an identity of a user is provided. The method includes generating a dynamic fingerprint while the user moves a finger along a trajectory of movement in a fingerprint collection area of a fingerprint reader. The method also includes comparing the dynamic fingerprint with a referential fingerprint, and verifying the identity of the user based on the comparison. The method further includes generating a report indicating the identity verified.

In another aspect of the present disclosure, a device for verifying an identity of a user is provided. The device includes a fingerprint reader, a memory for storing processor-executable instructions, and a processor programmed to carry out processor-executable instructions to generate a dynamic fingerprint while the user moves a finger along a trajectory of movement in a fingerprint collection area of the fingerprint reader. The processor is also programmed to compare the dynamic fingerprint with a referential fingerprint, verify the identity of the user based on the comparison, and generate a report indicating the identity verified. The device further includes an output for displaying the report.

In yet another aspect of the present disclosure, a non-transitory computer-readable medium having recorded thereon instructions, executable by a processor, for verifying an identity of a user is provided. The instructions include steps for generating a dynamic fingerprint while the user moves a finger along a trajectory of movement in a fingerprint collection area of a fingerprint reader, and comparing the dynamic fingerprint with a referential fingerprint. The instructions also include steps for verifying the identity of the user based on the comparison.

It is to be understood that the forgoing general description and the following detailed description are illustrative only, and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

The present disclosure overcomes the drawbacks of previous biometric technologies by introducing a novel approach and a corresponding device for verifying the identity of a user based on dynamic fingerprint acquisition and analysis. The novel approach collects a dynamic fingerprint while the user moves a finger along a trajectory of movement in a fingerprint collection area of a fingerprint reader of the corresponding device. The dynamic fingerprint combines fingerprint images and corresponding respective fingerprint positions. Thus, it would be more difficult for hackers to hack into a system by forging a static fingerprint image when the system adopts the novel approach and the corresponding device to verify identities.

Reference will now be made in detail to example embodiments, examples of which are illustrated in the accompanying drawings. The following description refers to the accompanying drawings in which same numbers in different drawings represent same or similar elements unless otherwise described. The implementations set forth in the following description of example embodiments do not represent all implementations consistent with the present disclosure. Instead, they are merely examples of devices and methods consistent with aspects related to the present disclosure as recited in the appended claims.

Figure 1:
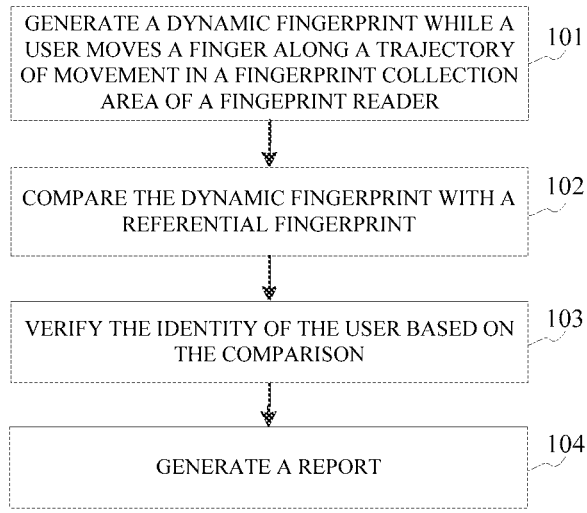
FIG. 1 is a flow chart illustrating a method for verifying the identity of a user, according to an exemplary embodiment.

Referring to FIG. 1, a flow chart is shown illustrating steps of a method for verifying an identity of a user, in accordance with aspects of the present disclosure. The method may be carried out using any suitable system, apparatus or device, such as the device described with reference to FIG. 5. As shown in FIG. 1, the method may include the following steps.

At step 101, at least one dynamic fingerprint may be generated while a user moves one or more fingers along a trajectory of movement in the fingerprint collection area of a fingerprint reader. The trajectory of movement may be vertical, horizontal or any random combination thereof. As a user slides or moves a finger along the trajectory of movement, a set of fingerprint images are acquired. The fingerprint images may be acquired at a predetermined time interval or at a predetermined imaging frequency. By way of example, the predetermined time interval may be approximately 1/10000s, or alternatively the imaging frequency may be 100 kHz, although other values may be possible. In some aspects, the predetermined time interval or imaging frequency may be selected by the user. Finger positions relative to a coordinate system of the fingerprint sensor or fingerprint reader may also be determined using the set of fingerprint images.

A composite image representative of the dynamic fingerprint of the user may then be generated using the acquired fingerprint images and respective fingerprint positions. The composite image may be assembled using fingerprint images acquired at various finger positions. For example, a composite image may be assembled using a number of fingerprint images acquired at a first position, and a number of fingerprint images acquired at a second position, which is displaced from the first position, either vertically, horizontally, or a combination thereof, with some degree of fingerprint overlap. Examples of fingerprint overlap may include anywhere between approximately 10% to approximately 90% fingerprint area overlap, although other overlaps may be possible. Any number of images at a specific position may be combined or averaged.

In some aspects, finger positions may be used to determine the direction or trajectory of movement of the user's finger. Based on the direction or trajectory of movement, a determination whether to interrupt or continue with subsequent steps can also be made at step 101. The determination may include accessing fingerprint and other information stored in a database, memory or other data storage location. For example, a comparison to a setup or predetermined direction or trajectory of movement may be made at step 101. Based on finger positions, a verification can also be made whether the user is moving or sliding the finger at an appropriate speed. If not, a prompt may direct the user to retrace or repeat the trajectory of movement.

At step 102, the dynamic fingerprint may then be compared with one or more referential fingerprints, such as referential fingerprints of known or approved users stored in a database, server, or other data storage location. To this end, the composite image generated at step 101 may be compared with a referential composite image associated with a given referential fingerprint. The referential composite image may be generated in a setup or initialization stage in a manner similar to the composite image. In some aspects, during the setup stage, an instruction may be given to the user to move the finger along a predetermined or selected trajectory of movement. Alternatively, the trajectory of movement associated with the referential fingerprint may be determined based on the movements of the user's finger in the setup stage.

In the comparison at step 102, one or more fingerprint features associated with the composite image may be identified and compared to corresponding fingerprint features in the referential composite image. Such features may include various portions of overlap 200 between different fingerprints, as shown in the examples of FIG. 2B. In this manner, a similarity or dissimilarity between the dynamic fingerprint and the referential fingerprint may be identified.

At step 103, the identity of the user can be identified based on the comparison at step 102. A report may then be generated, as indicated by step 104. The report may be in any form and provide various information. For example, the report may indicate a successful or failed authentication. The report may also indicate the identity of a verified user.

In conclusion, in the herein provided method for verifying the identity of a user, a dynamic fingerprint to be verified may be generated by imaging a user fingerprints while the user slides one or more fingers in a fingerprint collection area of a fingerprint reader. A composite image, representative of the dynamic fingerprint, may be assembled using a number of fingerprint images and compared to a referential composite image. In particular, by comparing various corresponding features in the composite images, the identity of the user may be identified. This approach provides an increased level of security for devices or systems that rely on biometric verification using fingerprints.

By contrast, in previous biometric verification technologies, a user's finger statically acts on the fingerprint collection area and the fingerprint sensor acquires a static fingerprint image to be verified. However, if the static fingerprint image is leaked, others may freely operate the device or terminal by inputting the static fingerprint image. Furthermore, because fingerprints are unchangeable, once static fingerprint images are obtained by unauthorized persons, the genuine user would either have to discontinue use of the device or perhaps use other, less secure, forms of authentication. By contrast, in the present dynamic fingerprint approach, a different trajectory of movement may be selected in a setup phase, thereby generating a different referential composite image and restoring user privacy again. Additionally, different fingerprint features may be analyzed in the composite image for authentication.

Figure 2A:
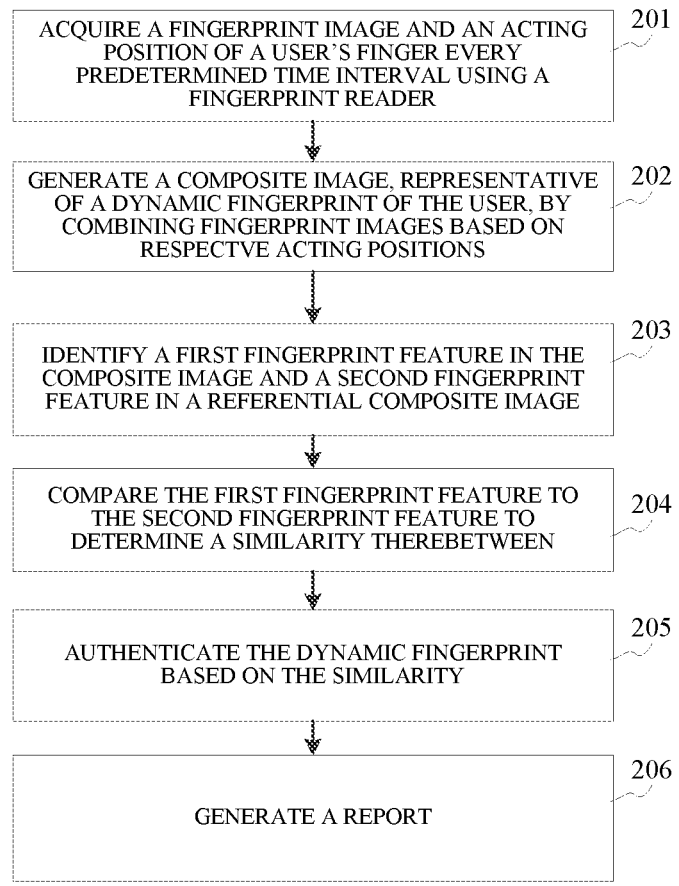
FIG. 2A is a flow chart illustrating a method for verifying a fingerprint according to another exemplary embodiment.
Figure 2B:
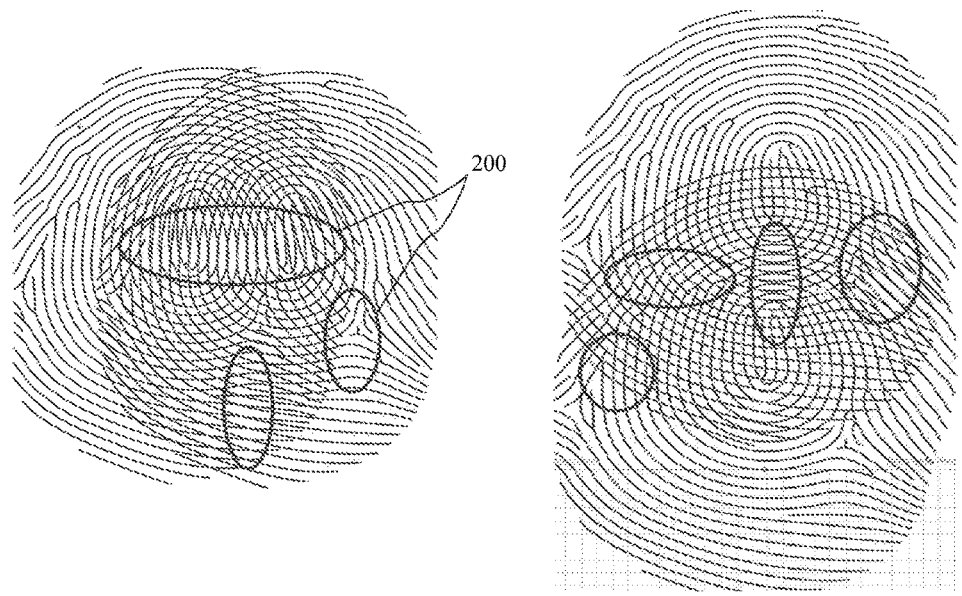
FIG. 2B is an example image of a dynamic fingerprint to be verified according to another exemplary embodiment.

Turning now to FIG. 2A, flow chart is shown illustrating a method for verifying a fingerprint according to another exemplary embodiment. The method may be carried out using any suitable system, device or apparatus, such as the device described with reference to FIG. 5. As shown in FIG. 2A, the method for verifying a fingerprint may include the following steps.

At step 201, as the user's finger slides in the fingerprint collection area, a fingerprint image and a current position of the finger along a trajectory of movement may be acquired every predetermined time interval. The fingerprint collection area may be an area provided with a fingerprint sensor or fingerprint reader. When the user's finger acts on the fingerprint collection area, the fingerprint sensor may detect the presence of the finger and begin acquiring the user's fingerprint. Alternatively, imaging may begin following an action by the user, such as activation of a button, or other input element. When the user's finger moves or slides in the fingerprint collection area, the fingerprint sensor may acquire a fingerprint of the finger every predetermined time interval.

As described, the value of the predetermined time interval or imaging frequency may be selected by the user and will not be limited in the embodiment. In a possible implementation, the predetermined time interval may be set to approximately 1/10000s, or alternatively an imaging frequency of approximately 100 kHz, although other values may be possible. Preferably, the predetermined time interval or imaging frequency may be set to values such that the composite image generated using the acquired fingerprint images is reproducible. This would avoid the problem that generated composite images to be verified, due to the different slide speeds, may be different from the referential composite image.

Since the dynamic fingerprint to be verified is generated based on the slide of the finger, current or acting positions of the finger may be recorded. The acting positions may be represented by coordinates in a reference frame of the fingerprint sensor or fingerprint reader.

At step 202, after the finger stops sliding, the composite image representative of the dynamic fingerprint of the user may be generated by combining various fingerprint images based on their respective acting position. For instance, a fingerprint may be imaged at acting positions 1, 2, 3, and 4, and the composite image may include fingerprint images of these 4 positions. As described, these may be include various fingerprint area overlaps. Indeed, as one of ordinary skill in the art would appreciate, the composite image may include any number of images from any number of acting positions.

At step 203, a first fingerprint feature in the composite image may be identified. As described, such fingerprint features may be formed in overlapping areas of the fingerprint imaged at different acting positions. As an example, FIG. 2B shows circled portions of overlap 200. Also, a second fingerprint feature in a referential composite image may also be identified at step 203, where the referential composite image is an image captured from the user during an initialization or setup stage. As mentioned, the process of acquiring the referential composite image, representative of the referential fingerprint, is the same as the process of acquiring the composite image to be verified, and will not be described herein. The device or terminal may store the referential composite image after the referential fingerprint images are acquired and processed, such that the terminal may use the referential composite image to perform the verification of the fingerprint. The slide direction and the slide path of the slide operation may be random and will not be limited in the embodiment.

At step 204, the first fingerprint feature is then compared to the second fingerprint feature to determine a similarity, or dissimilarity, therebetween. In this process, various image analysis algorithms may be utilized. In some aspects, the similarity may be determined by calculating the ratio of the number of the identical fingerprint features or feature elements (i.e. fingerprint ridges, gaps, and the like) shared by the composite and referential composite images, and the total number of the fingerprint features or feature elements in the composite image.

At step 205, the dynamic fingerprint of the user may be authenticated based on the similarity determined. For instance, in a successful authentication, the dynamic fingerprint to be verified is the same as the referential fingerprint if the similarity exceeds a predetermined threshold. Conversely, in a failed authentication, the dynamic fingerprint to be verified is different than the referential fingerprint if the similarity does not exceed the predetermined threshold. In some aspects, the predetermined threshold may be selected by the user. Based on the authentication, in some aspects, the identity of the user may be obtained.

A report may then be generated, as indicated by step 206. The report may be in any form, and provide information associated with the authentication or the identity of the user.

As appreciated from FIG. 2B, whether the verification of the fingerprint succeeds relates to the slide direction. When the slide direction mismatches, the verification of the fingerprint will fail. When the slide direction matches, the verification of the fingerprint may succeed. Furthermore, the process of assembling the composite image to be verified may consume more resources. Thus, in order to save resources, the terminal may exclude the fingerprint to be verified with mismatched slide direction, such that corresponding composite image to be verified may not be generated for the fingerprint.

Therefore, the method provided by the embodiment further includes: 1) detecting whether the slide direction of the finger is the same as the slide direction of generating the referential composite image; 2) determining, when the slide direction of the finger is different from the slide direction of generating the referential composite image, the verification of the user's fingerprint fails; and 3) triggering, when the slide direction of the finger is the same as the slide direction of generating the referential composite image, the step of acquiring a fingerprint image of the finger and an acting position of the finger every predetermined time interval in step 201.

For example, the slide direction of generating the referential fingerprint image is from up to down. When the slide direction of generating the composite image to be verified is from left to right, it may be determined directly that the verification of the fingerprint fails, and the process may be ended. When the slide direction of generating the composite image to be verified is from up to down, the composite image to be verified will be generated. The composite image to be verified may be compared with the referential composite image, and whether the verification of the fingerprint succeeds may be determined based on the result of the comparison.

It is noted that, in the embodiment, the owner of the terminal may reset the referential composite image according to a new slide operation when the dynamic fingerprint to be verified is leaked, wherein the referential composite image is different from the dynamic fingerprint to be verified, such that the security of the terminal may be guaranteed.

Figure 3:
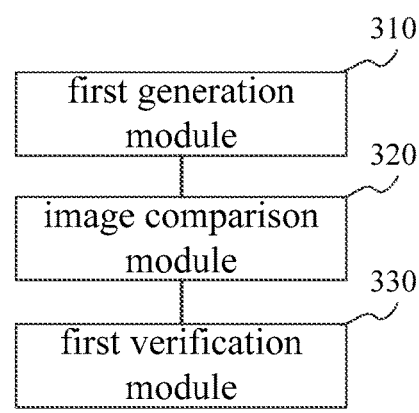
FIG. 3 is a block diagram illustrating a device for verifying a fingerprint according to an exemplary embodiment.

FIG. 3 is a block diagram illustrating a device for verifying a fingerprint according to an exemplary embodiment, and the device for verifying a fingerprint may be applied in a terminal. As shown in FIG. 3, the device for verifying a fingerprint may include a first generation module 310, an image comparison module 320, and a first verification module 330. The first generation module 310 may be configured to generate, when a user's finger slides in a fingerprint collection area, a fingerprint image to be verified. The image comparison module 320 may be configured to compare the composite image to be verified generated by the first generation module 310 with a referential composite image. When the image comparison module 320 determines that the composite image to be verified is the same as the referential composite image, the first verification module 330 may be configured to determine that verification of the user's fingerprint succeeds.

In conclusion, in the device for verifying a fingerprint provided in the present disclosure, a composite image to be verified is generated when a user's finger slides in a fingerprint collection area; the composite image to be verified is compared with a composite fingerprint image; and it is determined, when the composite image to be verified is the same as the referential composite image, that verification for the user's fingerprint succeeds. Thus, a dynamic fingerprint to be verified may be generated through combination of a slide action of the finger and a fingerprint of the finger, and the verification of the fingerprint is performed using the dynamic fingerprint image to be verified. As a result, the problem that the terminal is not safe if the user's fingerprint is leaked in the case that the verification of the fingerprint is performed by utilizing a static fingerprint image to be verified may be solved, and the security of the terminal may be improved.

Figure 4:
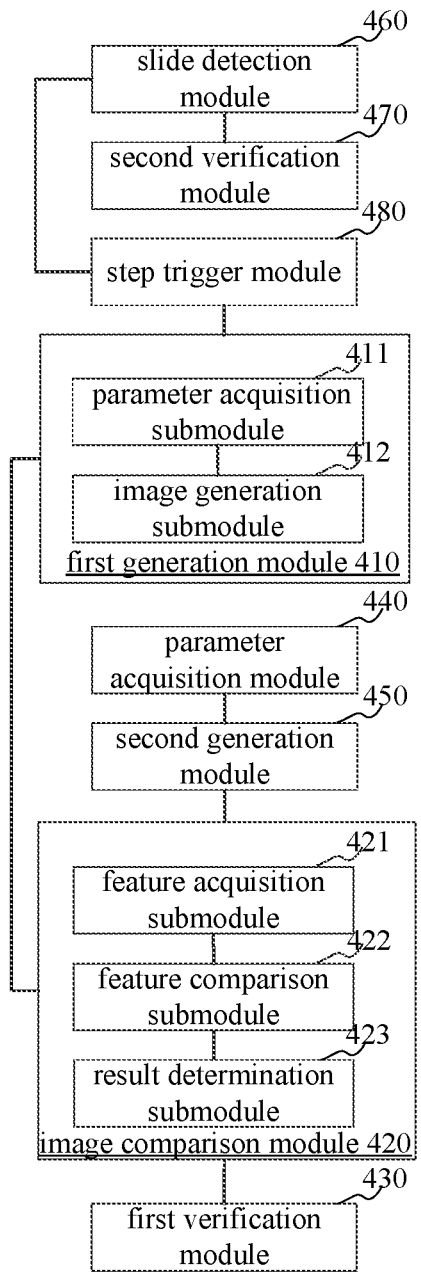
FIG. 4 is a block diagram illustrating a device for verifying a fingerprint according to an exemplary embodiment.

FIG. 4 is a block diagram illustrating a device for verifying a fingerprint according to an exemplary embodiment, and the device for verifying a fingerprint may be applied in a terminal. As shown in FIG. 4, the device for verifying a fingerprint may include a first generation module 410, an image comparison module 420, and a first verification module 430. The first generation module 410 may be configured to generate, when a user's finger slides in a fingerprint collection area, a fingerprint image to be verified. The image comparison module 420 may be configured to compare the composite image to be verified generated by the first generation module 410 with a referential composite image. The first verification module 430 may be configured to determine, when it is determined by the image comparison module 420 that the composite image to be verified is the same as the referential composite image, that verification of the user's fingerprint succeeds.

Optionally, the referential fingerprint image may be determined by a parameter acquisition module 440, a second generation module 450, and an image storage module 460. The parameter acquisition module 440 may be configured to acquire, when the user's finger slides in the fingerprint collection area, a fingerprint of the finger and an acting position of the finger every predetermined time interval. The second generation module 450 may be configured to generate, after the finger stops sliding, the referential composite image by combining various fingerprint images based on respective acting position.

Optionally, the first generation module 410 may include a parameter acquisition submodule 411 and an image generation submodule 412. The parameter acquisition submodule 411 may be configured to acquire, when the user's finger slides in the fingerprint collection area, a fingerprint of the finger and an acting position of the finger every predetermined time interval. The image generation submodule 412 may be configured to generate, after the finger stops sliding, the composite image to be verified by combining various fingerprint images acquired by the parameter acquisition submodule 411 based on respective acting position.

Optionally, the image comparison module 420 may include a feature acquisition submodule 421, a feature comparison submodule 422, and a result determination submodule 423. The feature acquisition submodule 421 may be configured to acquire and identify a first fingerprint feature formed in various overlapping areas in the composite image to be verified, and a second fingerprint feature in the referential composite image. The feature comparison submodule 422 may be configured to compare the first fingerprint feature with the second fingerprint feature. The result determination submodule 423 may be configured to determine, when it is determined by the feature comparison submodule 422 that the first fingerprint feature is the same as the second fingerprint feature, that the dynamic fingerprint to be verified is the same as the referential fingerprint.

Optionally, the device provided in the embodiment may further include a slide detection module 460, a second verification module 470, and a step trigger module 480. The slide detection module 460 may be configured to detect whether a slide direction of the finger is the same as a slide direction of generating the referential composite image. The second verification module 470 may be configured to determine, when it is detected by the slide detection module 460 that the slide direction of the finger is different from the slide direction of generating the referential composite image, that the verification of the user's fingerprint fails. The step trigger module 480 may be configured to trigger, when it is detected by the slide detection module 460 that the slide direction of the finger is the same as the slide direction of generated referential composite image, the first generation module to generate the composite image to be verified.

In conclusion, in the device for verifying a fingerprint provided in the present disclosure, fingerprint image to be verified is generated when a user's finger slides in a fingerprint collection area; the fingerprint image to be verified is compared with a referential fingerprint image; and it is determined, when the fingerprint image to be verified is the same as the referential fingerprint image, that verification for the user's fingerprint succeeds. Thus, a dynamic fingerprint image to be verified may be generated through combination of a slide action of the finger and a fingerprint of the finger, and the verification of the fingerprint is performed using the dynamic fingerprint image to be verified. As a result, the problem that the terminal is not safe if the user's fingerprint is leaked in the case that the verification of the fingerprint is performed by utilizing a static fingerprint image to be verified may be solved, and the security of the terminal may be improved.

It may be determined, when the slide direction of the finger is different from the slide direction of generating the referential fingerprint image, the verification of the user's fingerprint fails. Since determination of the slide direction may be easier, the fingerprint to be verified with mismatched slide direction may be excluded firstly. Thus, a waste of resources used to generate the fingerprint images to be verified for these fingerprints may be avoided, and the resources may be saved.

Additionally, with respect to the device in the above embodiments, specific manners for individual modules therein performing operations have been described in detail in the method embodiments and will not be elaborated herein.

An exemplary embodiment of the present disclosure provides a device for verifying a fingerprint, the device may implement the method for verifying a fingerprint provided in the disclosure. The device for verifying a fingerprint may include: a processor; a memory for storing processor-executable instructions. The processor may be configured to: generate, when a user's finger slides in a fingerprint collection area, a fingerprint image to be verified; compare the fingerprint image to be verified with a referential fingerprint image; and determine, when the fingerprint image to be verified is the same as the referential fingerprint image, that verification of the user's fingerprint succeeds.

Figure 5:
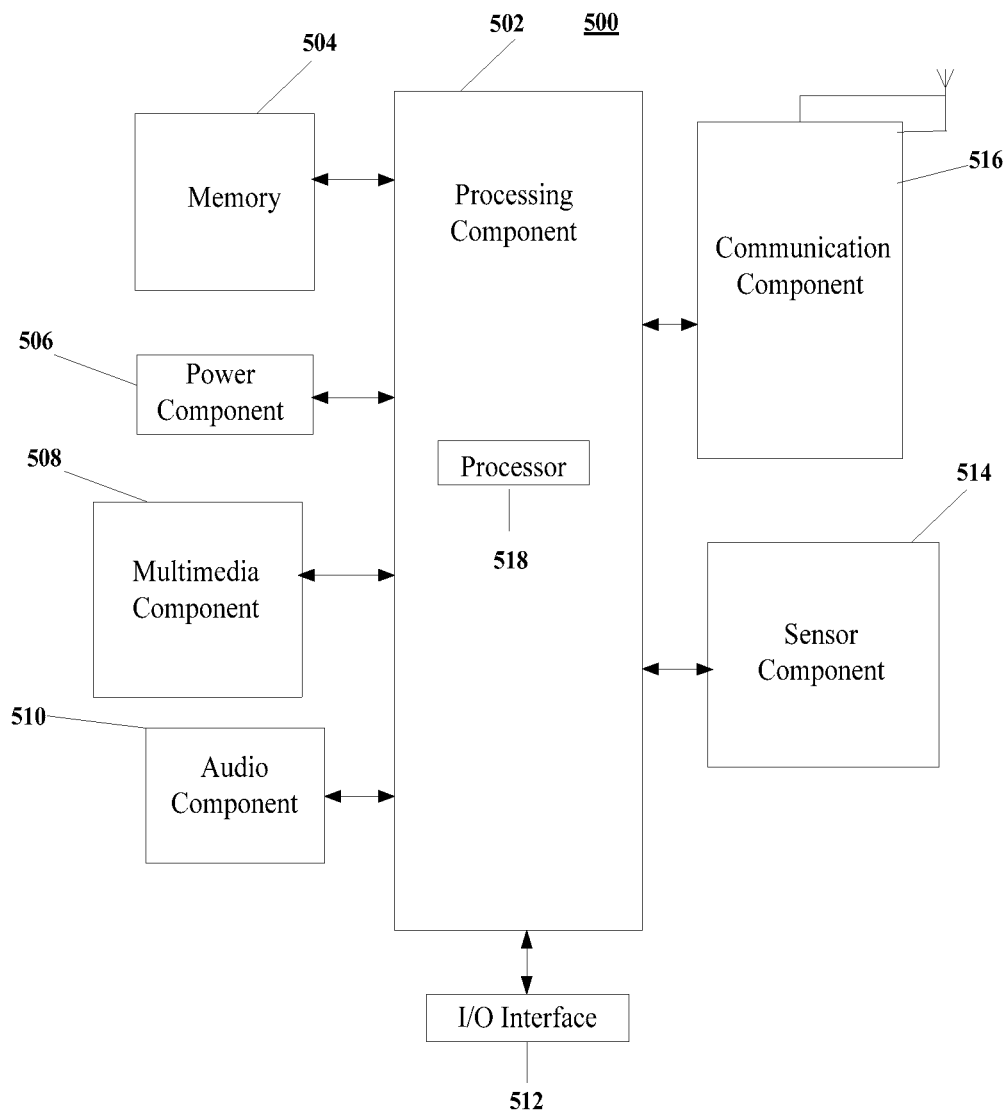
FIG. 5 is a block diagram illustrating a device for verifying a fingerprint according to an exemplary embodiment.

FIG. 5 is a block diagram illustrating a device for verifying a fingerprint according to an exemplary embodiment. For example, the device 500 may be a mobile phone, smartphone, personal computer, laptop, digital broadcast terminal, messaging device, gaming console, tablet, medical device, exercise equipment, personal digital assistant, and the like.

Referring to FIG. 5, the device 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the device 500, such as the operations associated with display, telephone calls, data communications, camera operations, and recording operations. The processing component 502 may include one or more processors 518 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the device 500. Examples of such data include instructions for any applications or methods operated on the device 500, contact data, phonebook data, messages, pictures, video, etc. The memory 504 may also include reference information, such as referential fingerprint information. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 500. The power component 506 may include a power management system, one or more power sources, and any other components associated with the generation, management, and distribution of power in the device 500.

The multimedia component 508 includes a screen providing an output interface between the device 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. The front camera and the rear camera may receive an external multimedia datum while the device 500 is in an operation mode, such as a photographing mode or a video mode. Each of the front camera and the rear camera may be a fixed optical lens system or have optical focusing and zooming capability.

The audio component 510 is configured to output and/or input audio signals. For example, the audio component 510 includes a microphone ("MIC") configured to receive an external audio signal when the device 500 is in an operation mode, such as a call mode, a recording mode and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a touchscreen, a click wheel, buttons, and the like. The buttons may include, but are not limited to, a home button, a volume button, a starting button, and a locking button.

The sensor component 514 includes one or more sensors to provide status assessments for various components of the device 500. For instance, the sensor component 514 may detect an open/closed status of the device 500, a relative positioning of components, e.g., the display and the keypad, of the device 500, a change in position of the device 500 or a component of the device 500, a presence or absence of user contact with the device 500, an orientation or an acceleration/deceleration of the device 500, and a change in temperature of the device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

In some aspects, the sensor component 514 may include a fingerprint reader or sensor having a fingerprint collection area that is configured to image fingerprints, including static and dynamic fingerprints, from a user. The fingerprint reader or sensor may include various sensing elements including capacitive, optical, thermal, pressure, and other sensing elements. In addition, the fingerprint reader or sensor may be integrated into a touchscreen, button, touch panel or pad, and the like.

The communication component 516 is configured to facilitate communication, wired or wirelessly, between the device 500 and other devices. The device 500 can access a wireless network based on a communication standard, such as WiFi, 2G, or 3G, or a combination thereof. In one example embodiment, the communication component 516 receives a broadcast signal or broadcast associated information from an external broadcast management system via a broadcast channel. In one example embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In example embodiments, the device 500 may be implemented with one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The device may use the circuitries in combination with the other hardware or software components for executing the method above. Each module, submodule, unit, or sub-unit disclosed above may be implemented at least partially using the one or more circuitries.

In example embodiments, there is also provided a non-transitory computer readable storage medium including instructions, such as included in the memory 504, executable by the processor 518 in the device 500, for performing the above-described methods. For example, the non-transitory computer-readable storage medium may be a ROM, a random access memory (RAM), a CD-ROM, a magnetic tape, a floppy disc, an optical data storage device, and the like.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the invention will be apparent to those skilled in the art from consideration of the specification and practice of the disclosures herein. This application is intended to cover any variations, uses, or adaptations of the disclosure following the general principles thereof and including such departures from the present disclosure as come within known or customary practice in the art. It is intended that the specification and embodiments be considered as illustrative only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for verifying an identity of a user, comprising:
   a) generating a dynamic fingerprint while the user moves a finger along a trajectory of movement in a fingerprint collection area of a fingerprint reader;
   b) comparing the dynamic fingerprint with a referential fingerprint;
   c) verifying the identity of the user based on the comparison; and
   d) generating a report indicating the identity verified,
   wherein generating the dynamic fingerprint comprises:
   acquiring, using the fingerprint reader, a set of complete fingerprint images corresponding with multiple finger positions along the trajectory of movement; and
   combining the set of complete fingerprint images into a composite image representative of the dynamic fingerprint,
   wherein comparing the dynamic fingerprint with the referential fingerprint at step b) comprises: comparing one or more fingerprint features with the referential fingerprint features to determine a similarity therebetween; and
   wherein the one or more fingerprint features comprise overlapped fingerprint regions between two adjacent complete fingerprints in the composite image.

2. The method of claim 1, further comprising:
   acquiring images in the set of complete fingerprint images every predetermined time interval.

3. The method of claim 1, further comprising:
   determining a current position of the user's finger along the trajectory of movement based on a current fingerprint image.

4. The method of claim 1, wherein comparing the dynamic fingerprint with the referential fingerprint at step b) comprises:
   identifying one or more fingerprint features in the composite image; and
   identifying referential fingerprint features in a referential composite image associated with the referential fingerprint.

5. The method of claim 1, further comprising:
   analyzing images in the set of complete fingerprint images to determine a direction of movement of the user's finger and a moving speed of the finger.

6. The method of claim 5, further comprising:
   making a determination whether to interrupt or continue step a) based on the direction of movement determined and the moving speed of the finger.

7. The method of claim 1, further comprising:
   generating the referential fingerprint by performing step a) during a setup phase.

8. The method of claim 7, further comprising:
   providing an instruction to the user to move the finger along a predetermined trajectory of movement.

9. The method of claim 1, further comprising:
   detecting whether the slide direction of the finger is the same as the slide direction of generating the referential composite image.

10. The method of claim 9, further comprising:
    determining, when the slide direction of the finger is different from the slide direction of generating the referential composite image, the verification of the user's fingerprint fails; and
    triggering, when the slide direction of the finger is the same as the slide direction of generating the referential composite image, acquiring the complete fingerprint image of the finger at predetermined time interval.

11. A device for verifying an identity of a user comprising:
    a fingerprint reader;
    a memory for storing processor-executable instructions;
    a processor programmed to carry out processor-executable instructions to:
    generate a dynamic fingerprint while the user moves a finger along a trajectory of movement in a fingerprint collection area of the fingerprint reader;
    compare the dynamic fingerprint with a referential fingerprint;
    verify the identity of the user based on the comparison; and
    generate a report indicating the identity verified; and
    an output for displaying the report,
    wherein the processor is further programmed to generate the dynamic fingerprint by acquiring, using the fingerprint reader, a set of complete fingerprint images corresponding with multiple finger positions along the trajectory of movement, and combining the set of complete fingerprint images into a composite image representative of the dynamic fingerprint,
    wherein the processor is further programmed to compare one or more fingerprint features with the referential fingerprint features to determine a similarity therebetween; and wherein the one or more fingerprint features comprise overlapped fingerprint regions between two adjacent fingerprints in the composite image.

12. The device of claim 11, wherein images in the set of complete fingerprint images are acquired every predetermined time interval.

13. The device of claim 11, wherein the processor is further programmed to:
identify one or more fingerprint features in the composite image; and
identify referential fingerprint features in a referential composite image associated with the referential fingerprint.

14. The device of claim 11, wherein the processor is further programmed to analyze images in the set of complete fingerprint images to determine a direction of movement of the user's finger.

15. The device of claim 14, wherein the processor is further programmed to make a determination whether to interrupt or continue to generate the dynamic fingerprint based on the direction of movement determined.

16. The device of claim 11, wherein the processor is further programmed to generate the referential fingerprint while the user moves a finger along a trajectory of movement.

17. A non-transitory computer-readable medium having recorded thereon instructions, executable by a processor, for verifying an identity of a user with steps comprising:

a) generating a dynamic fingerprint while the user moves a finger along a trajectory of movement in a fingerprint collection area of a fingerprint reader;
b) comparing the dynamic fingerprint with a referential fingerprint; and
c) verifying the identity of the user based on the comparison,
wherein generating the dynamic fingerprint comprises:
acquiring, using the fingerprint reader, a set of complete fingerprint images corresponding with multiple finger positions along the trajectory of movement; and
combining the set of complete fingerprint images into a composite image representative of the dynamic fingerprint,
wherein comparing the dynamic fingerprint with the referential fingerprint at step b) comprises: comparing one or more fingerprint features with the referential fingerprint features to determine a similarity therebetween; and
wherein the one or more fingerprint features comprise overlapped fingerprint regions between two adjacent fingerprints in the composite image.

18. The non-transitory computer readable medium of claim 17, the steps further comprising generating a report indicating the identity verified.

* * * * *